(12) United States Patent
Haikin

(10) Patent No.: US 7,038,811 B1
(45) Date of Patent: May 2, 2006

(54) STANDARDIZED DEVICE CHARACTERIZATION

(75) Inventor: John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/538,947

(22) Filed: Mar. 31, 2000

(51) Int. Cl.
G06F 15/00 (2006.01)
B41B 1/00 (2006.01)
G06K 19/00 (2006.01)

(52) U.S. Cl. ............... 358/1.9; 358/1.15; 382/165
(58) Field of Classification Search ......... 358/406, 358/504, 1.9, 518, 529, 527, 3.23, 3.12, 448, 358/1.1, 520, 523, 537; 345/571; 347/19; 382/167, 287, 165; 715/517
See application file for complete search history.

(56) References Cited

U.S. PATENT DOCUMENTS

| | | | |
|---|---|---|---|
| 5,062,714 A | 11/1991 | Peterson et al. | 356/406 |
| 5,339,176 A * | 8/1994 | Smilansky et al. | 358/504 |
| 5,502,580 A * | 3/1996 | Yoda et al. | 358/518 |
| 5,506,696 A * | 4/1996 | Nakano | 358/504 |
| 5,649,072 A | 7/1997 | Balasubramanian | 395/109 |
| 5,655,062 A * | 8/1997 | Tompkins et al. | 358/1.9 |
| 5,689,350 A * | 11/1997 | Rolleston | 358/504 |
| 5,760,913 A | 6/1998 | Falk | 358/298 |
| 5,798,943 A | 8/1998 | Cook et al. | 364/526 |
| 5,818,960 A | 10/1998 | Gregory, Jr. et al. | 382/167 |
| 5,838,465 A * | 11/1998 | Satou et al. | 358/520 |
| 5,911,139 A * | 6/1999 | Jain et al. | 707/3 |
| 5,913,205 A * | 6/1999 | Jain et al. | 707/2 |
| 5,936,741 A * | 8/1999 | Burns | 358/1.9 |
| 5,956,469 A * | 9/1999 | Liu et al. | 358/1.9 |
| 6,037,950 A * | 3/2000 | Meir et al. | 345/427 |
| 6,038,374 A | 3/2000 | Jacob et al. | 395/109 |
| 6,111,664 A * | 8/2000 | Aoki et al. | 358/448 |
| 6,222,648 B1 * | 4/2001 | Wolf et al. | 358/504 |
| 6,256,104 B1 * | 7/2001 | Rumph et al. | 358/1.15 |
| 6,310,698 B1 * | 10/2001 | Samworth | 358/3.12 |
| 6,320,668 B1 * | 11/2001 | Kim | 358/1.1 |
| 6,480,202 B1 * | 11/2002 | Deguchi et al. | 345/600 |
| 6,496,208 B1 * | 12/2002 | Bernhardt et al. | 345/853 |
| 6,498,610 B1 * | 12/2002 | Glaspy, Jr. | 345/603 |
| 6,597,363 B1 * | 7/2003 | Duluk et al. | 345/506 |
| 6,734,869 B1 * | 5/2004 | Murashita et al. | 345/589 |

(Continued)

FOREIGN PATENT DOCUMENTS

EP 518525 5/1992

(Continued)

OTHER PUBLICATIONS

"Argyll Color Management Project", (visited Oct. 19, 2000) <http://www.web.access.net.au/argyll/argyllcmm.html>, 5 pages.

(Continued)

Primary Examiner—Madeleine Nguyen
(74) Attorney, Agent, or Firm—Fitzpatrick, Cella, Harper & Scinto

(57) ABSTRACT

The present invention comprises a method of integrating characterization information associated with a target image for use with a color reproduction device wherein a measurement store is obtained that has an entry corresponding to a color patch of a target image, the entry comprising a color value of the color patch; updating the entry in the measurement store to include spatial information of the color patch in the target image; obtaining a measurement of the color patch in the target image; and updating the entry in the measurement store to include the measurement.

50 Claims, 13 Drawing Sheets

U.S. PATENT DOCUMENTS

| | | | |
|---|---|---|---|
| 6,853,464 B1* | 2/2005 | Ueda et al. | 358/1.9 |
| 2001/0033395 A1* | 10/2001 | Chizawa | 358/461 |

FOREIGN PATENT DOCUMENTS

| | | | |
|---|---|---|---|
| EP | 562971 | | 3/1993 |
| EP | 833212 | | 9/1997 |
| EP | 961260 | | 3/1999 |
| JP | 409069959 A | * | 3/1997 |
| WO | 96/01466 | | 1/1996 |
| WO | 96/08790 | | 3/1996 |

OTHER PUBLICATIONS

Gill, Graeme W., "Argyll Color Correction System: Simple CMYK Profile Generator", Nov. 9, 1996, 7 pages, 1996©.

Gill, Graeme, W., "Argyll Color Correction System: Test Target Chart Generator", Sep. 28, 1996, 9 pages, 1996©.

Gill, Graeme W., "Argyll Color Correction System: PostScript Print Chart Generator Module", Sep. 28, 1996, 17 pages, 1996©.

Gill, Graeme W., "Argyll Color Correction System: DTP51 Target Chart Reader", Oct. 4, 1996, 11 pages, 1996©.

Gill, Graeme W., "Argyll Color Correction System: Scanin: Input the scan of a test chart, and output cgats data uses scanrd to do the hard work", Jan. 29, 1997, 9 pages, © 1995©, 1996©, and 1997©.

Gill, Graeme W., "Argyll Color Correction System: CMYK Device Profile Generator", Feb. 15, 1997, 5 pages, 1996©, 1997©, and 2000©.

"Graphic Technology—Color Reflection Target for Input Scanner Calibration", American National Standards Institute, Inc., NPES The Association For Suppliers of Printing and Publishing Technologies, (1993), pp. 1-3, 12-14, 18-29.

* cited by examiner

HEADER PORTION
```
IT8.7/1
ORIGINATOR  "Company L"
DESCRIPTOR  "XYZ Calibration Data"
   •
   •
   •
```

FORMAT PORTION
```
NUMBER_OF_FIELDS 4
BEGIN_DATA_FORMAT
SAMPLE_ID  XYZ_X  XYZ_Y  XYZ_Z
END_DATA_FORMAT
NUMBER_OF SETS  178
```

DATA PORTION
```
BEGIN_DATA
A1    2.27  1.91  1.34
A2    4.16  2.99  1.84
        •
        •
        •
GS22 .21   .22   .18
END_DATA
```

FIG. 1

STANDARDIZED DEVICE CHARACTERIZATION

BACKGROUND OF THE INVENTION

1. Field of the Invention

The present invention relates to device calibration and characterization and, more particularly, to using a multi-step process wherein a data store is accessed during the process to retrieve and update the data therein and/or to determine a measurement status usable in identifying an initiation point, the data store including such data as device control signals, position information associated with color patches in a target image, and device measurement values used to characterize a color device.

2. Description of the Related Art

Computing systems use different types of input and/or output devices to reproduce colors in, for example, a color, or graphics, image. A color may be interpreted or represented differently depending on the device. For example, a camera may understand a given color red as its red "500" while the color that is displayed by a monitor when it is asked to generate the same red "500" corresponds more closely to a red "325". Device characterization is a process used to map device colors to a set (or sets) of standard, or reference, colors. Using the mapping obtained by characterizing a color device, it is possible to predict the actual color reproduced by the device to provide a consistent color reproduction across devices.

Using the conventional model for characterizing a color device, a target image is used that includes a collection of colored patches that represent a sampling of the colors that the device is expected to support. In the case of a printer, this is a set of printed sheets generated by the printer. In the case of a monitor, this is a set of displayed colors. In the case of a scanner, it is a target document that contains the color patches that is printed using some technology that is likely to be used with the scanner (e.g., photographic print film).

There is currently no universal format for target images for use with color devices regardless of the device type. In the case of scanners, there are multiple standard formats for target images, called 'IT8s', each of which is used with a particular print technology such as color print film, transparency film and 4-color print. However, these target image format are not intended for use with other color devices such as printers and/or monitors. In fact, there is currently no target image standard for use with such color devices.

Each IT8 target is therefore only useful for a particular print technology for use with scanners and other color input devices. Further, since the IT8 targets are produced by the manufacturers of the print technology, the target images are closely tied to the print technology with little or no regard to a scanner's other capabilities beyond those used with the particular print technology. This may result in only a limited part of the scanner's capabilities being addressed in the IT8 targets.

In the conventional characterization model, each of the color patches in a target image is measured using a standardized color measurement device (e.g., calorimeter or spectrophotometer). The resulting data is used, along with device control signals associated with each of the patches, to produce the device characterization. For a printer and monitor, for example, the device control signals are the signals used to generate the printed sheets and the displayed colors, respectively. For a scanner or other input device, the device control signals are the signals generated by the scanner as a result of scanning the target image containing the patches.

As with target image formats, there is currently no universal approach for storing measurements produced during the measurement process. With respect to scanners, there is a standardized data format that may be used to retain measurement data produced from an IT8 target image. The standardized data format, which is defined in an IT8 specification (available from the American National Standards Institute), defines a format for storing measurement data only. That is, there is no provision in the standard for retaining scanner control signals or other information associated with the measurement process. There is currently no standard for storing measurement data associated with printers and/or monitors.

To store scanner measurement data, there are currently three standard data formats each of which is used with different IT8 target images to store measurement data only: (1) the IT8.7/1 for use with transparency film; (2) the IT8.7/2 is used with print film to store measurement data; and (3) the IT8.7/3 standard for use with 4-color print.

FIG. 1 contains an example of a file using the IT8 standard to store measurement data associated with an IT8.7/1 (i.e., transparency film) target for use with scanners. The first three lines are part of a header and provide general descriptive information. The next five lines identify the syntax of the data portion of the file. That is, the number of rows of data (i.e., "NUMBER_OF_SETS"), the columns or fields within a row (i.e., "NUMBER_OF_FIELDS") and the corresponding field name associated with each field in the row (i.e., "SAMPLE_ID," "XYZ_X," etc.). The data portion of the IT8 file identifies the measurements obtained from scanning the target image.

The measurement values stored in the IT8.7/1 data file of FIG. 1 and the control signals obtained from the scanner as a result of scanning the corresponding IT8 target image may be used to generate a scanner profile (e.g., a profile that conforms with the International Color Consortium, or ICC profile) that takes into account the specific characteristics (e.g., the measurements) of the device. However, since the IT8.7/1 standard is used with a transparency print file target image, the scanner profile is limited to only this technology.

As discussed above, the characterization of a device is a multi-stage process including producing a target image and measuring the color patches in the target image. The process of producing a target image and measuring color patches in the target image is often times very time consuming as a target image may comprise may hundreds or thousands of patches.

However, it may be determined that an error occurred during the measurement. Using the conventional model, it is necessary to repeat the entire process. For example, the measurements obtained may be flawed due to flaws in the target image medium (e.g., a wrinkle or tear in the medium). It may be determined that additional patches are needed to take into account more measurements in a given range of the color spectrum. Alternatively, it may be that the process did not complete because it was interrupted for some reason (e.g., a hardware crash).

Further, it may be that multiple target images are needed to characterize a color device. For example, as discussed above, in the case of scanners, there are target images for print film, 4-color print and transparency technologies. However, scanners are typically intended for use in a general purpose environment in which other types of output medium or ink may be used. Also, it may be that a scanner may have a wider color range than can be supported by any single output device. Using the current approach, a different target is produced and a separate characterization process is performed for each target.

Under the current approach, there is no standardized mechanism for use with all types of color devices. Further, there is no ability to determine which, if any, portion of the measurement process is to be performed to avoid repeating the entire process. In addition, there is no ability to retain measurement information in a single location.

SUMMARY OF THE INVENTION

The present invention comprises a method of integrating characterization information associated with a target image for use with a color reproduction device wherein a measurement store is obtained that has an entry corresponding to a color patch of a target image, the entry comprising a color value of the color patch; updating the entry in the measurement store to include spatial information of the color patch in the target image; obtaining a measurement of the color patch in the target image; and updating the entry in the measurement store to include the measurement.

The measurement store according to this method therefore holds measurement information that may be used to characterize the color reproduction device. The measurement store may be ported to multiple computers and/or characterization programs to characterize the color reproduction device on multiple hardware and/or software platforms.

In a further aspect of the present invention, the measurement store may be examined to determine whether an entry in the measurement store is missing some portion of an entry component.

In so doing, it is possible to determine from the data file the actual state, or stage, of the measurement process at any given time. Using the state information, it is possible to determine what, if any, portion of the measurement process is to be performed. Further, it is possible to modify the measurement store to add data and cause the measurement process to operate only on the new data. Thus, for example, it is possible to measure a device with newly introduced color patches without processing previously-processed patches. A data store that contains the output generated during the multi-step measurement process may then be used to characterize the device.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 1 is an example of an IT8 data file containing measurement data.

DETAILED DESCRIPTION OF THE PREFERRED EMBODIMENTS

Figure 2:
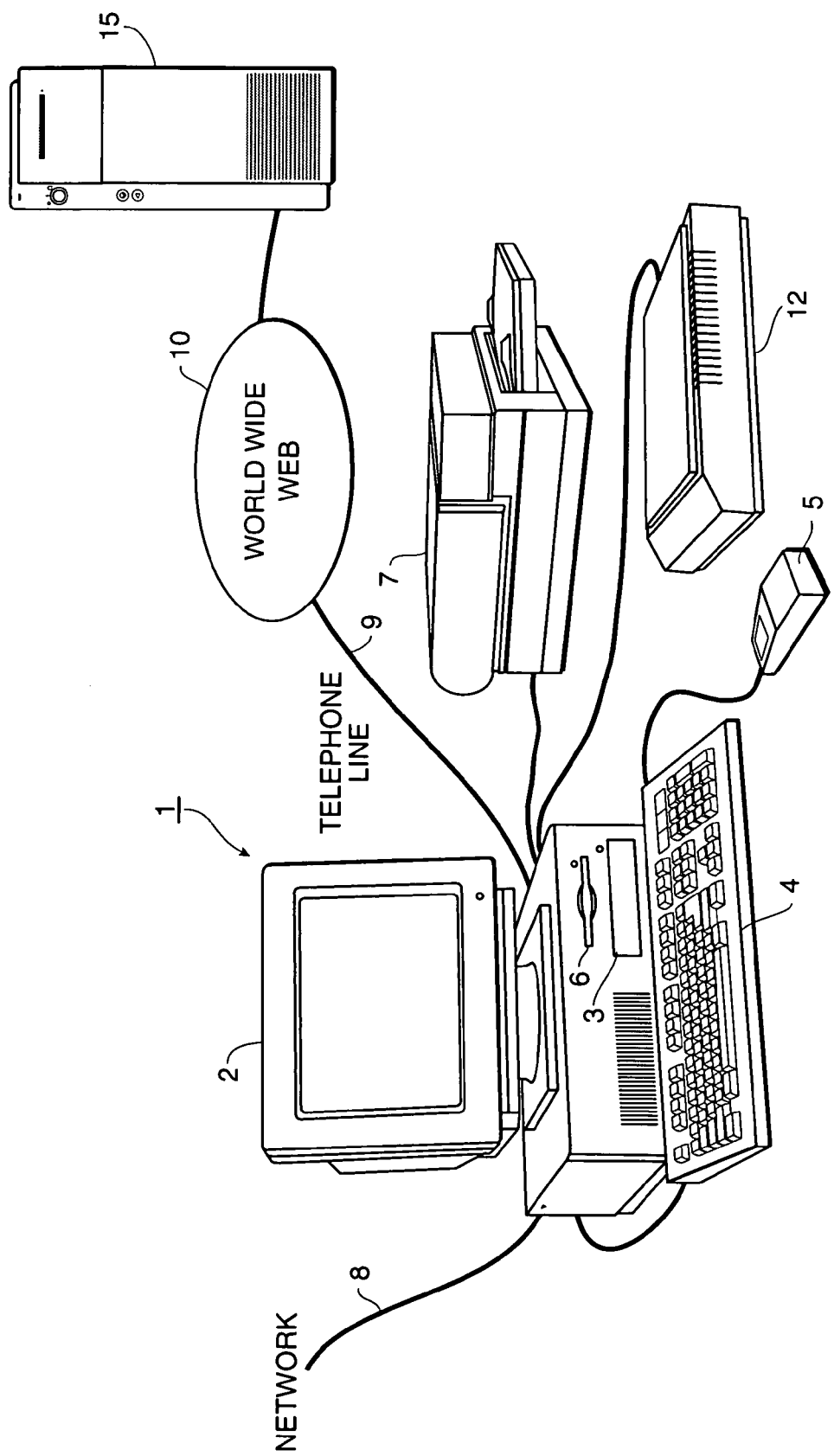
FIG. 2 is an outward view of representative computing hardware embodying the present invention.

FIG. 2 is an outward view of representative computing hardware embodying the present invention. Shown in FIG. 2 are computer 1 executing a browser-enabled operating system, such as Microsoft Windows98®, display monitor 2 for displaying text and images to a user, keyboard 4 for entering text and commands into computer 1, and mouse 5 for manipulating and for selecting objects displayed on display monitor 2. Also included with computer 1 are fixed disk drive 3, in which are stored computer-executable process steps of the windowing operating system and of other programs and process steps executed by computer 1. Fixed disk 3 also stores data files and device drivers for use with computer 1. Floppy disk drive 6 provides an interface to computer 1 for reading data from and writing data to floppy disks inserted therein. Using floppy disk drive 6, the above-described computer executable process steps and/or data files may be input to computer 1 and stored on fixed disk 3.

Computer-executable process steps and data files may also be retrieved over a network via connection 8 or via connection 9 (e.g., a telephone line) from World Wide Web 10. In addition, control signals (e.g., control signals generated from scanning an image) can be received from scanner 12 and stored on fixed disk 3. Data and/or applications may also be accessed from a CD-ROM via a CD-ROM drive (not shown). Printer 7 is used to output hard copy images in response to control signals received from computer 1 executing an application program and/or device drivers. Printer 7 may be an ink jet printer, a laser beam printer or the like.

Computer-executable process steps and data files obtained by computing equipment 1 over World Wide Web 10 are transferred thereto by servers such as server 15. In response to a request for data, server 15 collects the required data, properly formats the data, and sends the data to computing equipment 1 over World Wide Web 10. Further, by executing a web browser application, web pages and associated data can be received from World Wide Web 10. In addition, data including images and programs may be received by computer 1 via World Wide Web 10.

Figure 3:
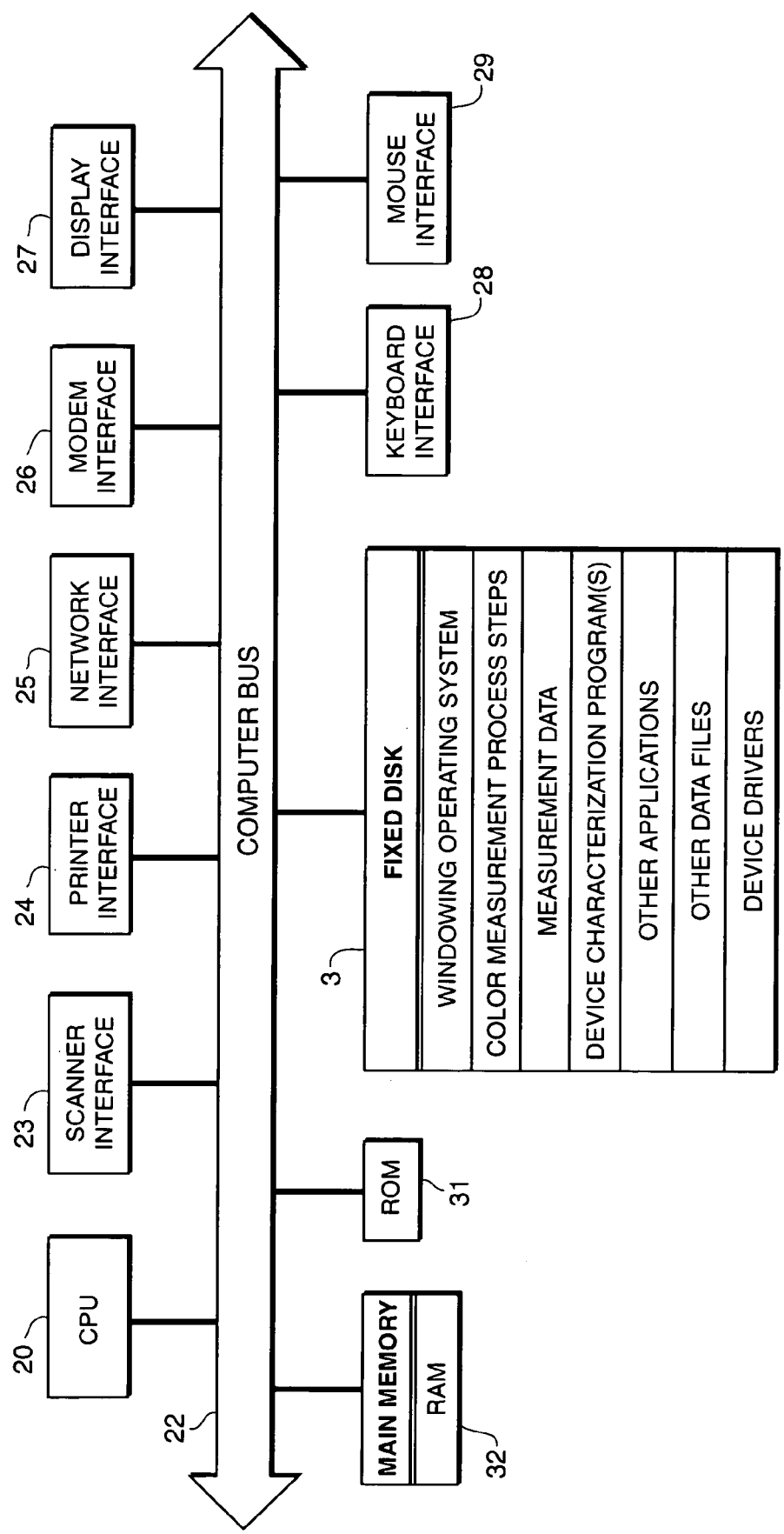
FIG. 3 is a block diagram of the internal architecture of computer 1.

FIG. 3 is a block diagram of the internal architecture of computer 1. Shown in FIG. 3 are CPU 20, which is preferably a Pentium-type microprocessor, interfaced to computer bus 22. Also interfaced to computer bus 22 are scanner interface 23 for interfacing to scanner 12, network interface 25 for interfacing to network connection 8, printer interface 24, to allow computer 1 to communicate with printer 7, modem interface 26 to enable communications between computer 1 and its internal modem, display interface 27 for interfacing with display monitor 2, keyboard interface 28 for interfacing with keyboard 4, and mouse interface 29 for interfacing with mouse 5. Of course, if computer 1 connects to World Wide Web 10 by a connection other than a telephone connection, a suitable interface other than modem interface 29 may be utilized.

Read only memory (ROM) 31 stores invariant computer-executable process steps for basic system functions such as basic I/O, start up, or reception of keystrokes from keyboard 4.

Main random access memory (RAM) 32 provides CPU 20 with memory storage which can be accessed quickly. In this regard, computer-executable process steps configured to measure color output of a device as well as other process steps of a image editor or other application program are transferred from fixed disk 3 over computer bus 22 to RAM 32 and executed therefrom by CPU 20.

Also shown in FIG. 3 is fixed disk 3 which includes a windowing operating system as well as other applications executable in computer 1 which may include a web browser, word processing, spreadsheet, graphics, gaming applications as well as applications downloaded from World Wide Web 15 (e.g., an interactive photo shop interface application). Fixed disk 3 further includes data files and device drivers as shown.

As is described in more detail below, fixed disk 3 further includes process steps configured to measure color input and/or output of color devices and maintain a store of measurement data. The measurement data may be used to determine a measurement state, and as well as to be accessed by one or more device characterization programs and/or measurement programs for use in characterizing the color device.

Preferably, the measurement data is stored in a data file on fixed disk 3 using a standardized format such as the IT8 data file. According to the IT8 format, an IT8 data file includes header, format and data portions as well as tags, or keywords. In the format portion, tags are used to identify the format of the data in the data portion. As described above, the "NUMBER_OF_FIELDS" and "NUMBER_OF_SETS" tags may be used to identify the number of rows and columns in the data portion. Additional tags may be used to identify the type of data contained in each field. For example, there are tags that identify a field as containing RGB (e.g., an "RGB_R" tag indicating that the field contains a red color component value in the RGB color model), XYZ (e.g., an "XYZ_X" tag identifying an "X" component of XYZ tristimulus data) or "CMYK_C" (e.g., "CMYK_C" tag identifying a cyan component in the CMYK color model).

The present invention defines tags in addition to those defined in the IT8 standard to identify spatial information as well as other information. Additional tags include "POS_X" and "POS_Y" which identify data types that specify an "X" and "Y" offset location from a known location (e.g., offset from a known alignment mark such as the upper, right-hand corner alignment mark), "POS_DX" and "POS_DY" which identify size data types, and "POS_UNITS" which identify the units of measure (e.g., inches, millimeters, pixels, etc.) for positioning values. Rather than specifying a "POS_DX" and "POS_DY" value for each color patch, where the color patches are of uniform size within the target image, "PATCH_HEIGHT" "PATCH_WIDTH" tags may be used to identify the uniform color patch height and width.

In the case where individual height and width are given, the POS_X and POS_Y values identify the upper left-hand corner of a rectangle that bounds the color patch. In this case where a uniform height and width are given along with a PATCH_HEIGHT and PATCH_WIDTH, POS_X and POS_Y data are interpreted to be the center of a rectangle of the size indicated.

To identify the dimensions of a target image page of a target image, "TARGET_WIDTH" and "TARGET_HEIGHT" tags define data types expressed in "POS_UNITS" that indicate the size of the target area on the target image. The target image size is no greater than the physical size of the target image medium. For example, if a target image is generated on letter size paper (8.5"×11"), the target width and height is no larger than 8.5"×11". As is discussed in more detail below, the "TARGET_WIDTH" and "TARGET_HEIGHT" tags are used to facilitate determining the alignment of the target image. Alignment information is useful in determining the location of a color patch in a target image.

In addition to the new data tags, the present invention uses existing tags to identify the new information (e.g., device control signals) included in the IT8 data file.

Figure 4:
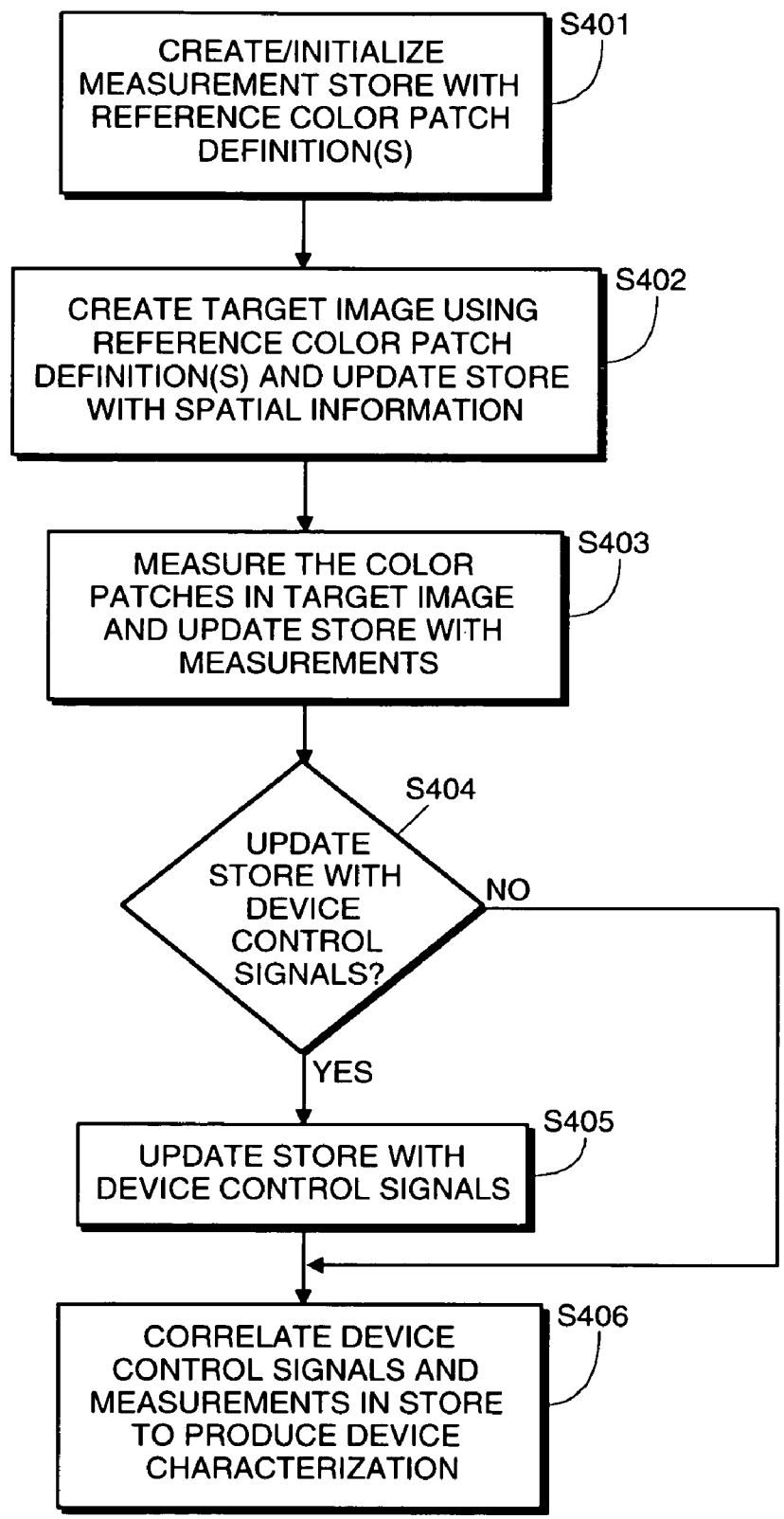
FIG. 4 provides an overview of a process of measuring a color device and maintaining a measurement store according to the present invention.

FIG. 4 provides an overview of a process of measuring a color device and maintaining a measurement store according to the present invention. The measurement store that is created and/or updated during measurement may be used to characterize the device by correlating device control signals with measured values.

Further, data in the measurement store may be used to generate the target image. Where the color device is an output device such as a printer or monitor, for example, the reference colors that are stored in the measurement store may be sent as device control signals to the color output device to generate the color patches which are then measured to yield the measured values. In a case of an input device such as a scanner or a digital camera, for example, the device control signals are generated by the color device upon input of a target image and the color patches in the target image are measured to yield the measured values. The correlation between device control signals and measured values provides a mapping between each of the reference colors and a color of the device.

Thus, once characterized, there is a one-to-one correlation between device control signals and measured values. It is therefore possible to predict a color which is generated (or detected in a case of an input device) for a given reference color. It is also possible, to use the correlation to formulate a prediction for colors other than reference colors. For example, where an unmeasured color is encountered, it is possible to derive a corresponding device control signal using an interpolation operation that makes use of reference colors that are similar to the unmeasured color and their corresponding device control signals. For example, it is possible to derive a device control signal that falls between two device control signals associated with two measured reference colors between which the unmeasured color falls.

Referring to FIG. 4, at S401, a measurement store is created or initialized that initially holds one or more reference color definitions. The measurement store may be a data file in the form of an IT8 data file. For greater efficiency during processing, some or all of the measurement store may be written to a location in RAM 32 which is then written back to an IT8 data file for more permanent storage.

Figure 5:
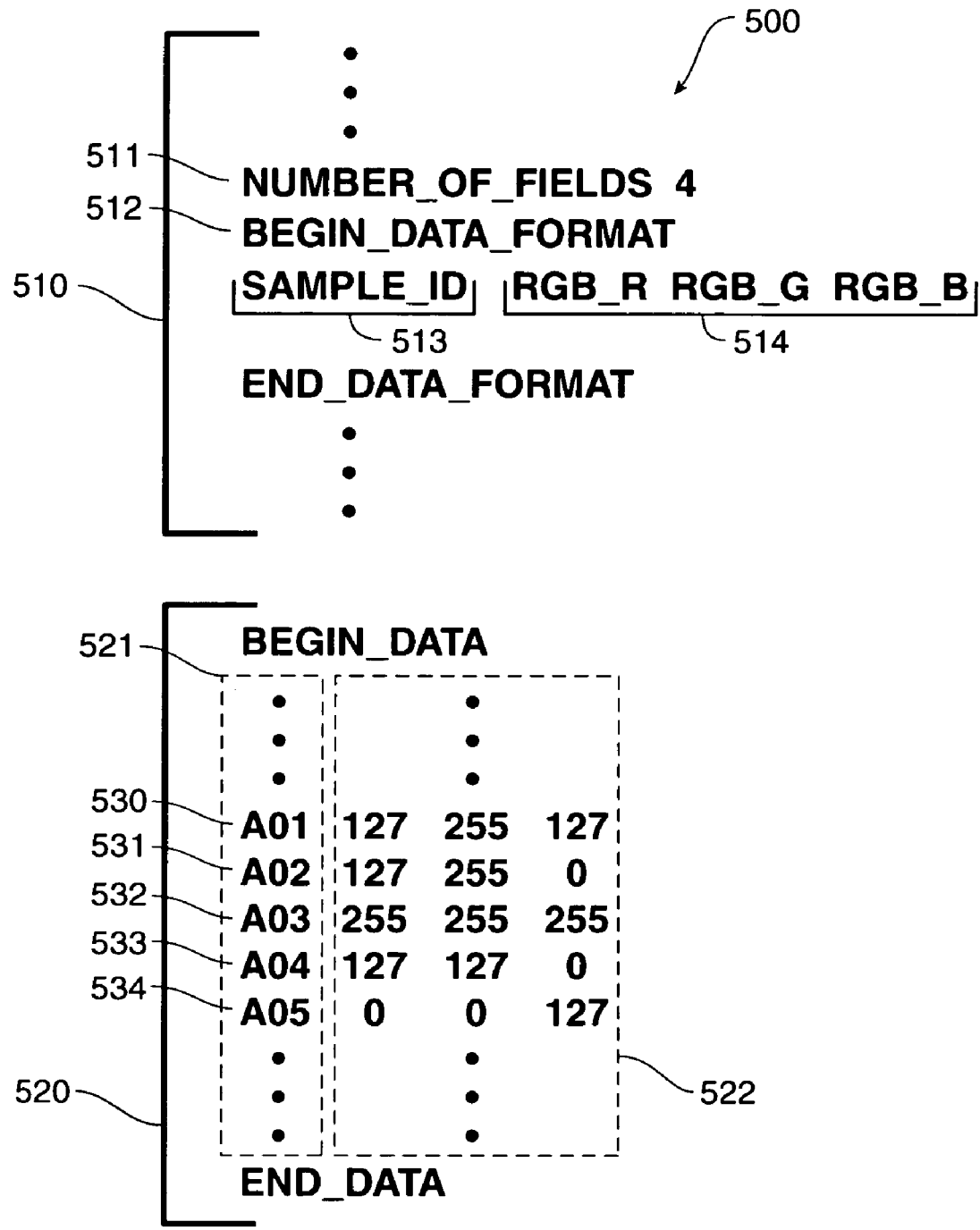
FIG. 5 illustrates a measurement store including reference color values according to the present invention.

Referring to FIG. 5, measurement store 500 includes data portion 520 which comprises rows, or entries, 530 to 534 of data each of which includes fields. As indicated in entries 511, 512, 513 and 514 of format portion 510, there are currently four fields that comprise an entry in data portion 520. As indicated in tag definition 513 of entry 512, a first field, which comprises identifier section 521, is an identifier field that contains an identification of the entry and/or corresponding color patch. The remaining three fields, which comprise a reference color section 522, contains color values. The color values in section 522 represent both the values used to generate a target image's color patches and an output device's control signals. As is discussed in more detail below, in case of an input device, section 522 may initially represent values used to generate the color patches, but is updated to include the device control signals generated by the input device. As indicated in tag definition 514 of entry 512, in the example of FIG. 5, the color values are expressed as red, green and blue color components in the RGB color model. Each of the rows in color section 522 defining a different reference color.

Figure 6:
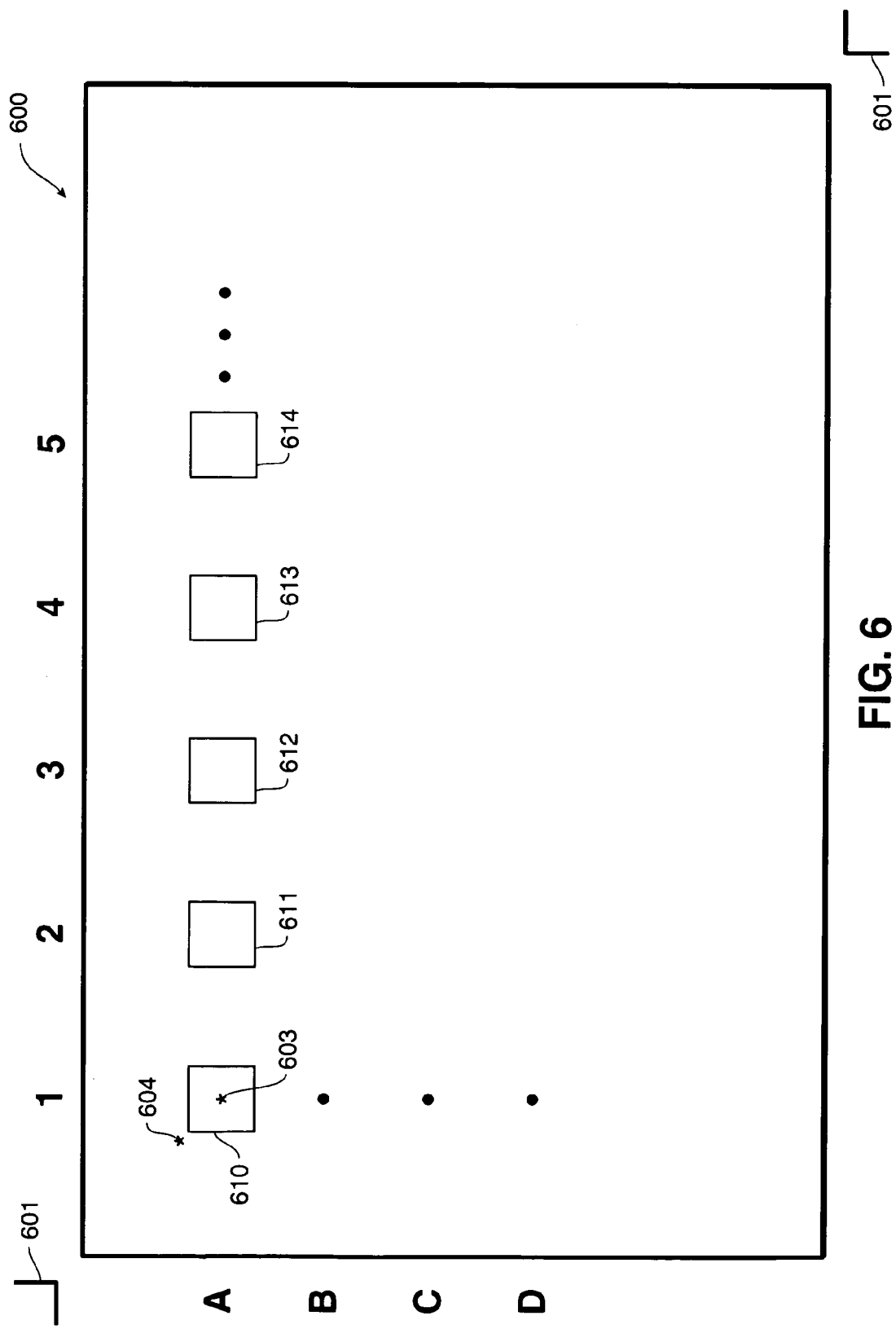
FIG. 6 provides an example of a portion of a target image including color patches according to the present invention.

Referring again to FIG. 4, the reference colors in measurement store 500 may be used to create a target image comprised of color patches, at S402, and measurement store 500 is updated to reflect the position of the color patch in the target image. FIG. 6 provides an example of a portion of a target image including color patches according to the present invention. In the example of FIG. 6, target image 600 is arranged using a rectangular grid, however, it should be apparent that other arrangements (e.g. hexagonal grid) may be used.

The color patches depicted in target image 600 reflect a typical target image in that the color patches are of uniform size and positioning. However, it is notable that irregular positioning and/or sizing may be used with the present invention, since measurement store 500 is updated to reflect the position and size of each color patch in a target image. Measurement 500 may be accessed to identify a position of a color patch within a target image during color measurement. Thus, it is not necessary to use pre-determined or uniform positions and sizes of color patches.

Target image 600 includes alignment points 601 that are used to detect and adjust for any misalignment. In addition, target image 600 includes color patches 610 to 614 that correspond to entries 530 to 534 (respectively) in measurement store 500. Since a uniform height and width are given, the POS_X and POS_Y values identify center position 603 of color patches 610 to 614. If individual height and width values were specified using POS_DX and POS_DY field identifiers, POS_X and POS_Y would identify corner position 604 of color patches 610 to 614.

As is discussed in more detail below, to generate a color patch, an entry is retrieved from measurement store 500 and the color component values defined in reference color section 522 are used to generate a color patch. For example, the reference color values in entry 530 (i.e., "127 255 127") are used to generate color patch 610 of target image 600. Similarly, color patches 611 to 614 are generated using the reference color value definitions of entries 531 to 534, respectively.

Figure 7:
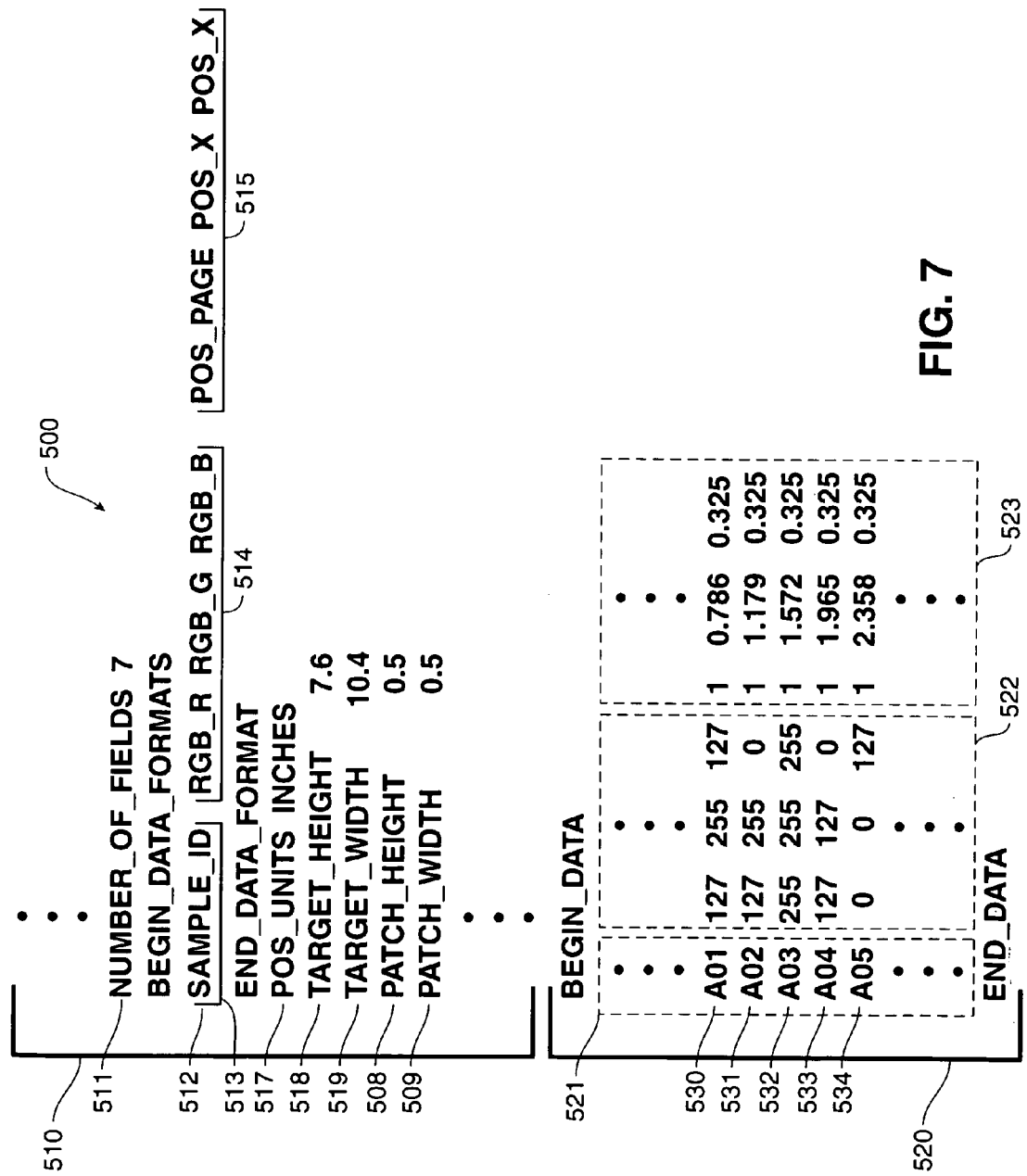
FIG. 7 illustrates the measurement store of FIG. 5 including spatial information according to the present invention.

Preferably, the mechanism (e.g., patch printing process) that causes target image 600 to be generated updates format portion 510 to include entries 517 to 519. Entries 517 to 519 which identify the spatial information unit of measure and the dimensions of the target image on an output medium. In the example of FIG. 7, a uniform color patch size (i.e., 0.5 inches) is designated in entries 508 and 509.

After a color patch is generated in target image 600, measurement store 600 is updated with spatial information of the color patch. FIG. 7 illustrates measurement store 500 updated to include spatial information section 523, comprising fields POS_PAGE, POS_X and POS_Y, for each of color patches 610 to 614. Preferably, format portion 510 and data portion 520 are updated. For example, entry 511 is updated to include the additional fields that contain the spatial information and entry 512 is updated with tag definition 515 to add the tags that identify each new field's data type. More particularly, in the example of FIG. 7, the "POS_PAGE", "POS_X" and "POS_Y" tags are added to indicate that the corresponding fields in data portion 520 contain page, x-location and y-location data, respectively. Since a uniform color patch size is specified in format portion 510 (i.e., entries 508 and 509), "POS_DX" and "POS_DY" fields are not needed. Referring to data portion 520, corresponding fields in spatial section 523 are appended to entries 530 to 534. For example, entry 530 is updated to reflect that color patch "A01" is in page one of the target image at an x and y offset location of "0.786" and "0.325".

Referring again to FIG. 4, measurement store 500 is updated with spatial information for each of the color patches that is generated during S402. At S403, the spatial information is used to locate a color patch in the target image so that each patch may be measured to determine an associated measurement value or values. Measurement store 500 is then updated to include the measurements obtained in S403.

Figure 8:
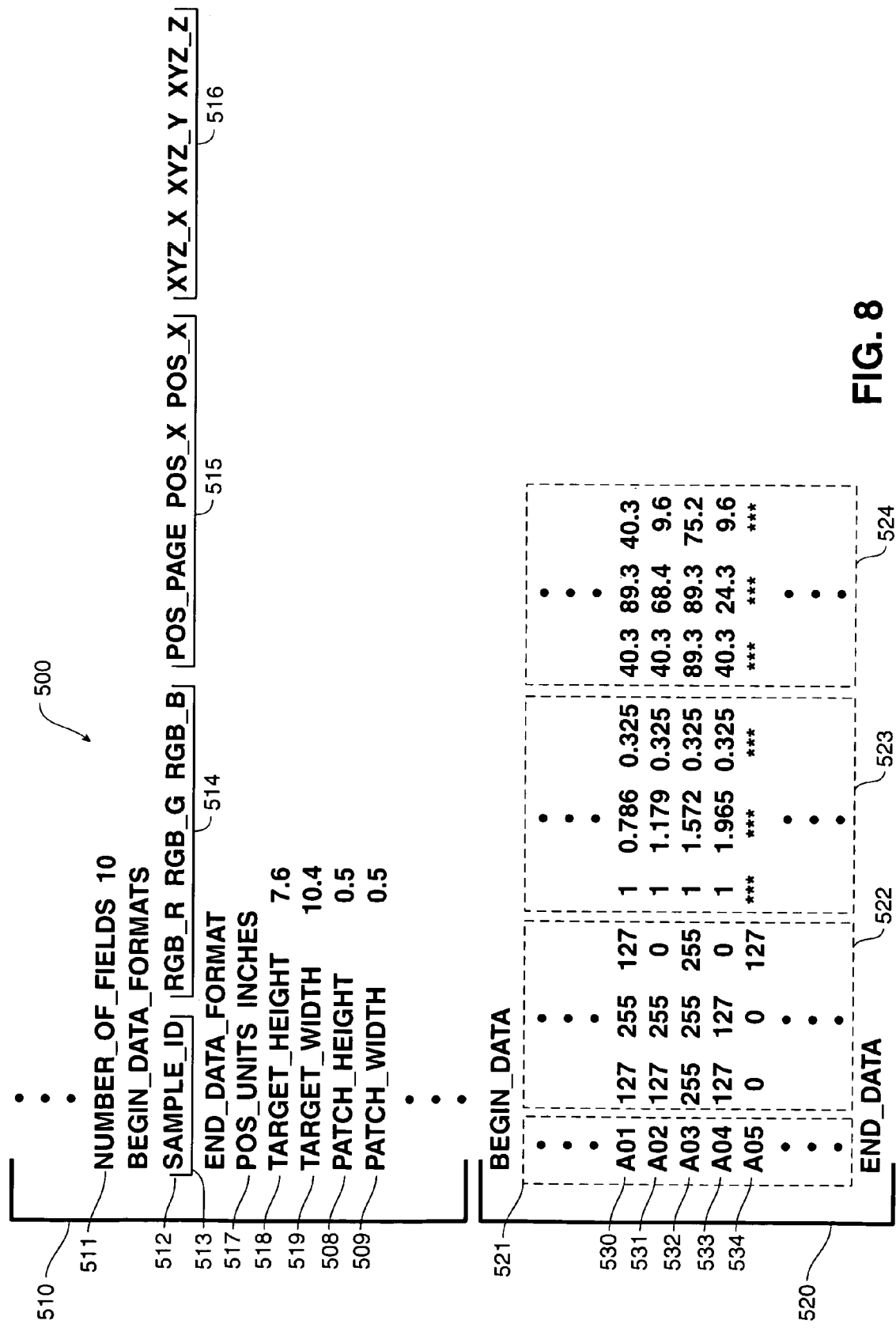
FIG. 8 illustrates the measurement store of FIG. 7 including measurements according to the present invention.

FIG. 8 illustrates the measurement store data of FIG. 7 including measurements according to the present invention. Entry 511 is updated to reflect the additional fields that contain the measurements and entry 512 is updated to add the tags in tag definition 516 that identify each new field's data type. In the example of FIG. 8, the "XYZ_X", "XYZ_Y" and "XYZ_Z" tags are added to entry 512 to indicate that the corresponding fields in data portion 520 contain XYZ tristimulus measurement values. Measurement section 524 contains sample measurement values.

As discussed above, measurement store 500 contains device control signals used by output devices to generate target image 600. However, in the case of an input device (e.g., scanner, digital camera, etc.), device control signals are generated by the device. In such a case that the color device generates device control signals, measurement store 500 is updated to reflect the generated signals. Referring to S404 of FIG. 4, a determination is made whether or not to update measurement store 500 with the generated signals. If not processing continues at S406 to characterize the device using the information contained in measurement store 500.

However, if it is determined at S404 to update measurement store 500 with the generated device control signals, processing continues at S405. Measurement store 500 may be updated using various techniques. For example, additional fields of an input signal portion may be added to the data portion to contain the generated signals. In this case, another set of tags may be added to identify the new fields as containing such data. Alternatively, reference color section 522 may be updated to reflect the generated signals.

At S406, measurement store 500 is used to characterize the color device whose device control signals and associated measurement values are contained in measurement store 500.

Since measurement store 500 retains the data generated at each step for use by another step in the measurement process, one or more steps may be performed on different computing equipment. This provides the ability to be able to use multiple hardware and/or software platforms to optimize processing and any particular capabilities of the hardware and/or software. For example, it may be that a particular measurement device or device characterization software is desired. Since measurement store 500 holds the results of each step in the process, it is possible to port measurement store 500 to a specific platform.

It may be desirable to repeat some or all of the measurement process to collect measurement information as a substitute for, or supplement of, the information contained in measurement store 500. Measurement store 500 may be accessed to determine which, if any, point of the measurement process is to be repeated. More particularly, measurement store 500 may be examined to identify "missing" (or "removed") data. Preferably, missing data is indicated in measurement store 600 by a non-numeric placeholder such as an "*" or a "?" character (or characters). If, for example, positional data is missing from measurement store 600, measurement is commenced at S402 of FIG. 4. Referring to FIG. 8, for example, entry 534 is missing spatial and measurement information. Similarly, if measurement data is missing, measurement is commenced at S403 of FIG. 4. If device control signals are missing from measurement store, measurement commences at S405 to update measurement store 500 to include device control signals.

A new target image page is generated in each pass of the measurement process where the target image or color patch dimensions (e.g., "TARGET_WIDTH" and "TARGET_HEIGHT") differ, additional entries corresponding to entries 508 to 509 and 517 to 519 may be added to measurement store 500. According to the IT8 standard, the new entries are added after data portion 520 followed by another data portion 520. Of course, it should be apparent that other techniques are available to alter formatting for an associated data portion 520.

Figure 9:
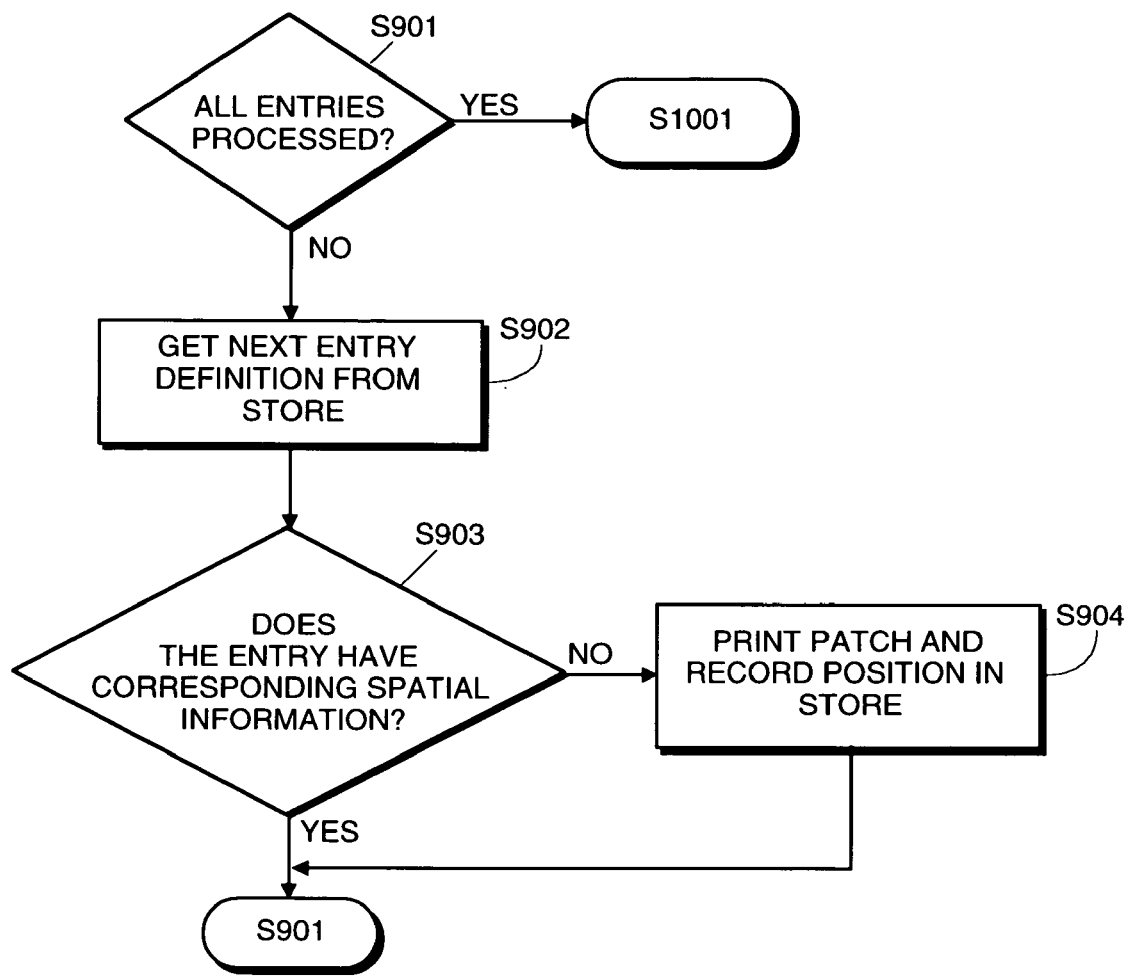
FIGS. 9 to 11 illustrate a flow diagram of process steps wherein measurement store 500 is examined to identify missing data and measurement is performed in response to the missing data according to the present invention.
Figure 10:
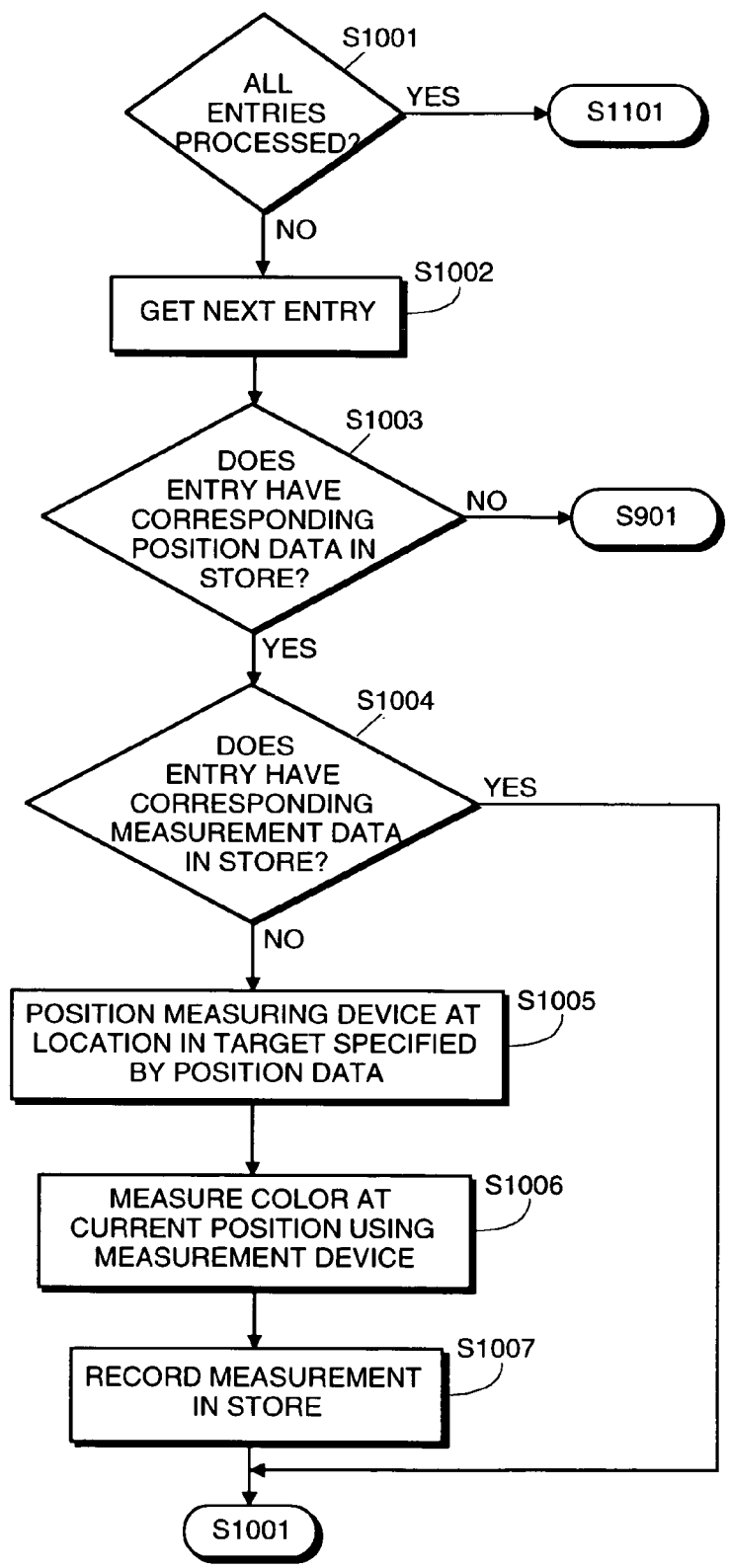
Figure 11:
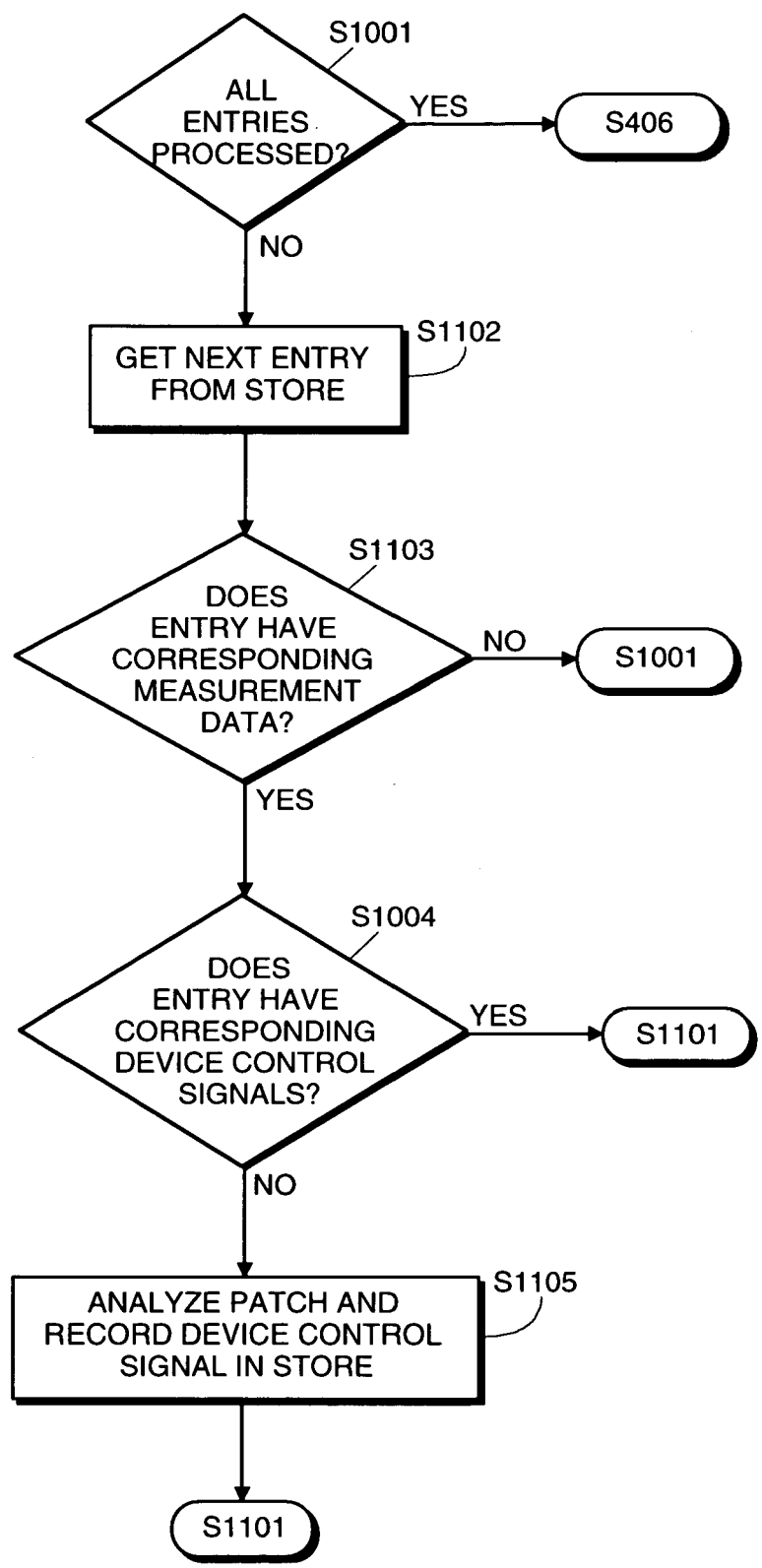

FIGS. 9 to 11 illustrate a flow diagram of process steps wherein measurement store 500 is examined to identify missing data and measurement is performed in response to the missing data according to the present invention.

Referring to FIG. 9, the process steps contained therein may be used to generate a target image with color patches corresponding to entries in measurement store 500 that do not have some or all of the spatial data identified in entry 512 (e.g., entry 534 of FIG. 8). At S901, a determination is made whether all of the entries in data portion 520 of measurement store 600 have been processed. If so, processing continues at S1001 of FIG. 10 to examine measurement store 500 for missing information in measurement section 523 (see FIG. 8).

If it is determined that not all of the entries in data portion 520 have been examined, processing continues at S902 to get the next entry in data portion 520. At S903, a determination is made whether or not the entry is missing some or all of its spatial information. If no spatial information is missing, processing continues at S901 to process any remaining entries. If it is determined that there is some missing spatial information, processing continues at S904 to generate the color patch in the target image and to record the spatial information associated with the generated color patch. Processing continues at S901 to process any remaining entries in measurement store 500.

Once all of the entries have been examined for missing spatial information and those with missing information processed to generate a target image and collect spatial information, processing continues at S1001 to examine measurement section 524 for missing data. At S1001, a determination is made whether all of the entries have been processed. If so, processing continues at S1101 to identify whether measurement store 500 is to be updated to furnish missing device control signal data.

If it is determined, at S1001, that not all of the entries have been processed, processing continues at S1002 to get the next patch. At S1003, a determination is made whether or not the entry is missing spatial information. If so, processing continues at S901 to furnish the missing spatial information. Alternatively, processing can continue at S1001 thereby skipping the entry that is missing the spatial information during this pass.

If it is determined, at S1003, that the entry is not missing the spatial information, processing continues at step S1004 to determine whether the entry is missing measurement data. If, for example, the entry does not have a value (e.g., a field contains a non-numeric placeholder) for any or all of the measurement fields (e.g., entry 534 of FIG. 8), processing continues at S1005 to use the spatial information associated with the entry to position the measurement device over the color patch. At S1006, the measuring device obtains a color measurement of the color patch which is recorded, at S1007 in measurement store 500. Processing continues at S1001 to process any remaining entries in data portion 520.

Once all of the entries have been examined and processed to provide any missing spatial information and/or measurement information, processing continues at S1101 of FIG. 11 to determine whether or not measurement store 500 is to be updated with device control signal information. At step S1101, a determination is made whether or not all of the entries in data portion 520 have been processed. If so, characterization of the device may be done using the information contained in measurement store 500 (e.g., S406 may be performed).

If it is determined at S1101 that there are remaining entries, processing continues at S1102 to get the next entry. At S1103, a determination is made whether the entry has corresponding measurement data. If not, processing continues at S1003, to furnish the missing measurement information. Alternatively, processing can continue at S1104 thereby skipping the entry that is missing the measurement information during this pass.

If it is determined, at S1103, that the entry does contain measurement data, processing continues at S1104 to determine whether or not the entry is missing device control signals. For example, such a case exists where the device to be characterized is an input device. If it is determined that the entry already contains the device control signals, processing continues at S1101 to process any remaining entries.

Where, however, it is determined (at S1104) to update measurement store 500 with the device control signals, processing continues at S1105 to cause the device to capture the target image (e.g., in the case of a scanner, to scan a target image page) and record the device control signals associated with a patch in the target image in measurement store 500. Processing continues at S1101 to process any remaining entries (e.g., an entry associated with a color patch on another page of the target image).

In the process steps of FIGS. 9 to 11, measurement store 500 is examined to identify missing data and thereby to determine the state of measurement. The measurement state is then used to determine what, if any, portion of the measurement process is to be performed. It should be noted that other methods may be used to determine a measurement state other than by identifying a placeholder for missing data. For example, it is possible to use one or more fields in measurement store 500 which may act as a flag or indicator of a measurement state. A different indicator value may be used to identify whether to perform target generation and spatial data update, color measurement and measurement value update and/or device control signal determination and update. Further, it may be possible to use an indicator to indicate whether or not to perform a device characterization using some or all of the information in measurement store 500.

Using the features of the present invention, measurement store 500 may be manipulated using an editor to add additional entries, or remove data associated with an existing entry, before initiating the process steps of FIGS. 9 to 11. In a case that new readings are desirable to provide coverage in a certain range of the color spectrum, new entries may be added to measurement store 500 that include a color patch identifier and a reference color definition. When a new entry is encountered at S903 of FIG. 9 with missing spatial information, S904 is performed to generate a color patch using the reference color definition and measurement store is updated to reflect the color patch's spatial information. Similarly, when a new entry is encountered at S1004 of FIG. 10 and S1104 of FIG. 11, measurement store 500 is updated to include the missing measurement and (if needed) device control signals, respectively.

In the above example of FIGS. 9 to 11, processing for one section of data portion 520 (e.g., sections 522 to 524) is completed before beginning processing on the next section. However, it is possible to perform some or all of the process steps for all of the section of an entry before proceeding to the next entry. This is especially applicable in the case of a monitor where each color patch may be sequentially output to the display.

Figure 12:
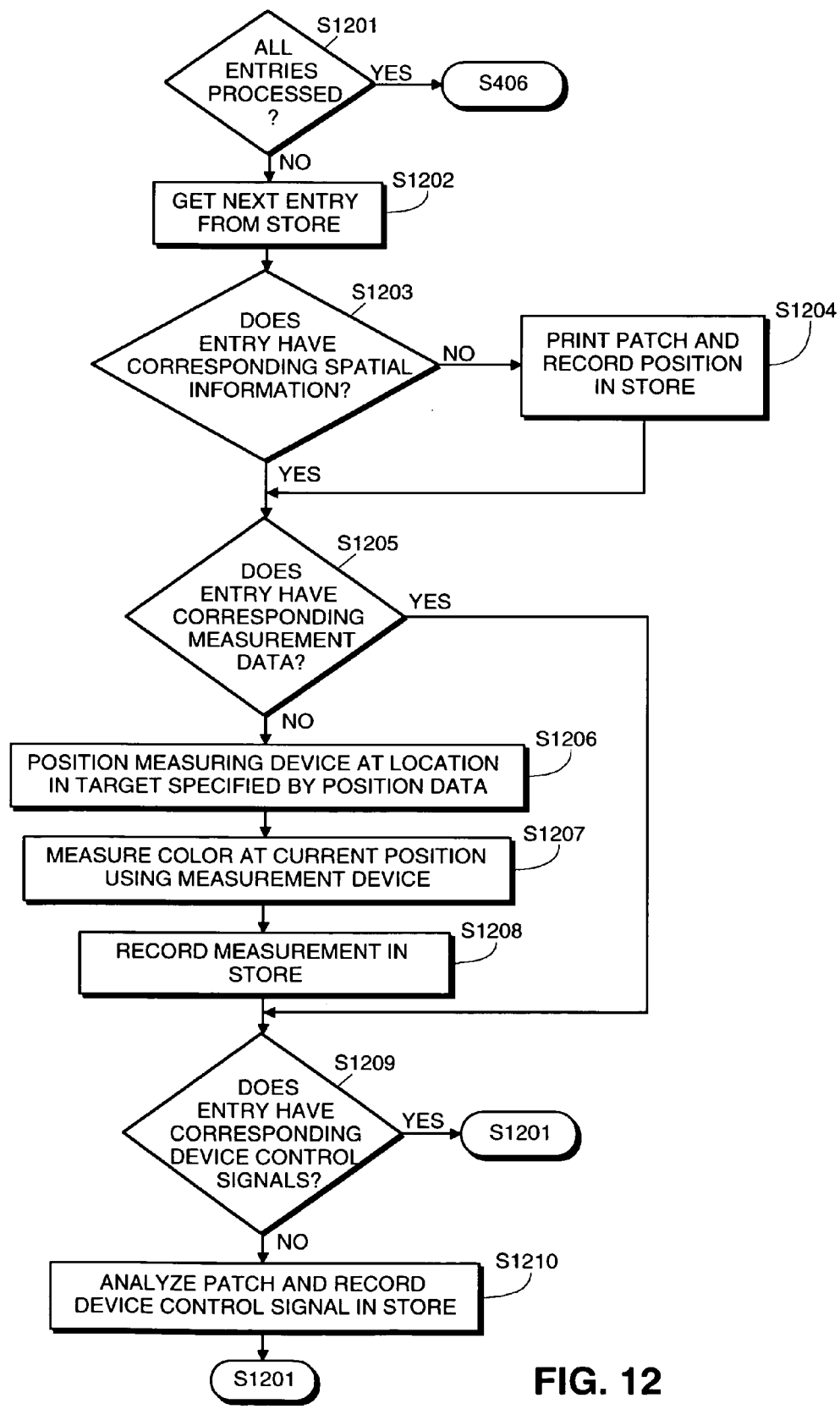
FIG. 12 illustrates a process flow configured to process each of the sections of a entry before proceeding to the next entry according to the present invention.

FIG. 12 illustrates a process flow configured to process each of the sections of a entry before proceeding to the next entry according to the present invention. At S1201, a determination is made whether or not all of the entries have been processed. If so, processing continues at S406 of FIG. 4 to characterize the device using the information in measurement store 500.

If not, processing continues at S1202 to get the next entry in measurement store 500. At S1203, a determination is made whether or not the entry has corresponding spatial information. If not, processing continues at S1204 to print the color patch, record the spatial information in measurement store 500. In either case, processing continues at S1205 to determine whether or not the entry includes measurement information. If not, processing continues at S1206 to S1208 to obtain measurements for the color patch. In either case, processing continues at S1209 to determine whether or not the entry is to be updated with device control signals generated by the color device. If so, processing continues at S1210 to obtain the device control signals. In either case, processing continues at S1201 to process any remaining entries.

As described above with reference to S1005 of FIG. 10, for example, color patches of a target image are measured to obtain color patch measurements. Because a measurement device may not have a firm, fixed place to put the image during measurement, the target image may be placed in the device with some offset and/or skew. In order to properly position the measurement head over a patch, it is necessary to be able to locate the patch from the position information in measurement store 500. Typically, the individual that places the image into a measurement device indicates the location of the alignment marks so that the measurement program can calculate the relative location of each color patch on the measurement device table. To do so accurately, it is important to account for any skew of the document on the table as well as the offset.

Depending upon the format of the target image, there will be some agreed-upon location on the image that is to be treated as the upper-left corner of the target as well as another location that will be treated as the lower-right corner. This may be special printing on the document, such as target circles or fiducial marks (e.g., alignment marks 601 in FIG. 6), or it may be agreed upon as the upper-most, left-most and right-most, bottom-most color patches themselves.

Figure 13:
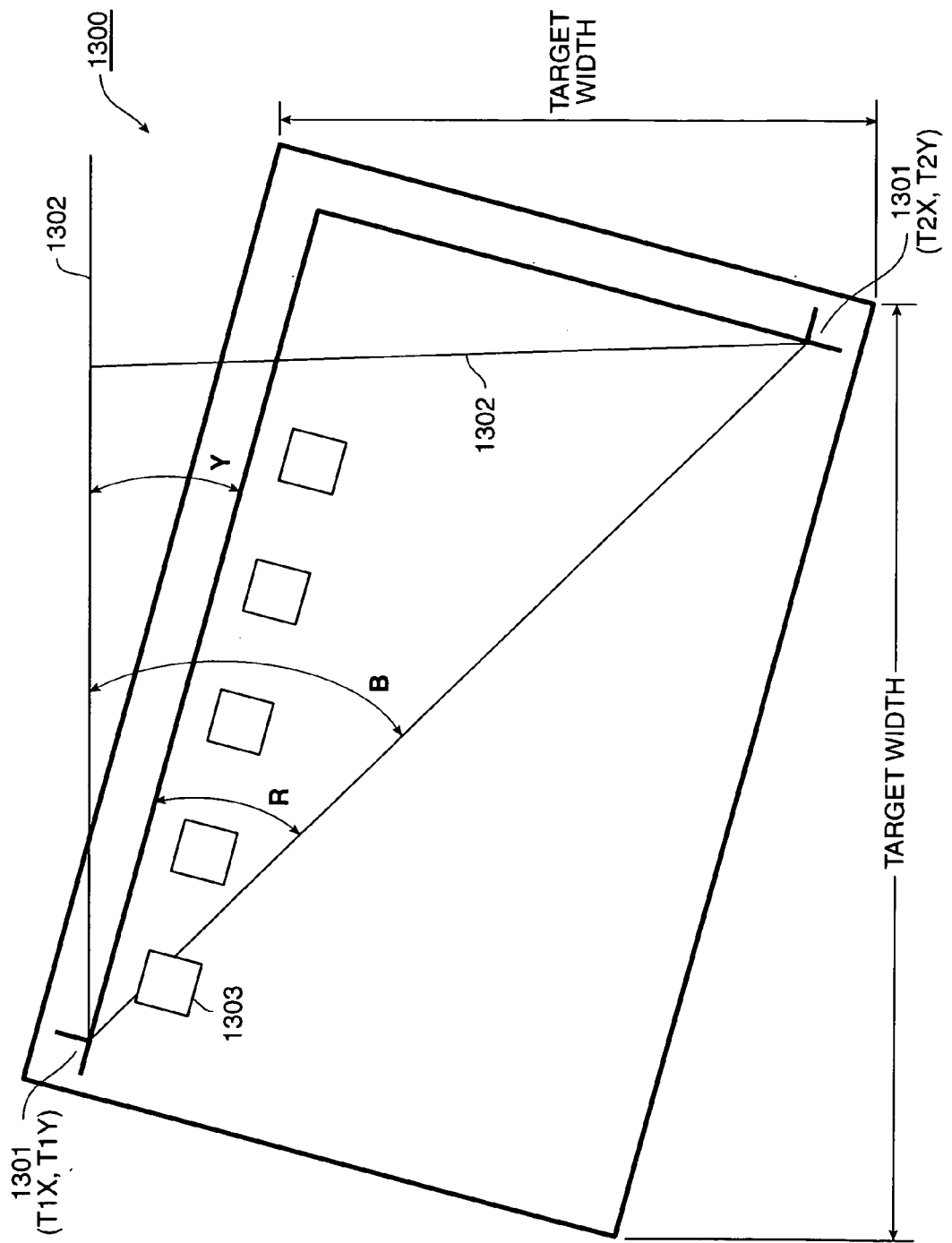
FIG. 13 illustrates alignment variables according to the present.

The inclusion of the TARGET_HEIGHT and TARGET_WIDTH tags and corresponding data in measurement store 600 provides information that may be used to calculate the skew based on the locations of the alignment marks. FIG. 13 provides an overview of an alignment determination.

Referring to FIG. 13, target image 1300, with color patches 1303, includes alignment marks 1301 that identify the upper, right-hand and lower, left-hand corners of target image 1300 and have x and y locations $T_1x$, $T_1y$ and $T_2x$, $T_2y$ (respectively). Reference lines 1302 represent the desired alignment and point out a skew associated with the target image on the page.

The angle of the target area, $\alpha$, is equal to arc-tangent of the height of the target (as specified by TARGET_HEIGHT) divided by the width of the target image (as specified by TARGET_WIDTH). In other words:

$$\alpha = A\ \text{TAN}(\text{TARGET\_HEIGHT}/\text{TARGET\_WIDTH}).$$

The alignment angle, $\beta$, may be obtained from the location of the alignment marks as follows:

$$\beta = A\ \text{TAN}((T_2y - T_1Y)/(T_2x - T_1x)).$$

The skew angle, $\gamma$, is equal to $\beta - \alpha$. The x-offset is $T_1x$, the y-offset is $T_1y$.

What is claimed is:

1. A method of integrating characterization information associated with a target image for use with a color reproduction device comprising:

obtaining a measurement store having an entry corresponding to a color patch of a target image, the entry comprising a color value of the color patch, which is used by the color reproduction device to create the target image;

updating the entry in the measurement store to include spatial information of the color patch in the target image, the spatial information relates to a position of the color patch;

obtaining a measurement of the color patch in the target image by measuring, using a color measuring device, a color of the target image based on the spatial information; and updating the entry in the measurement store to include the measurement.

2. A method according to claim 1, wherein the measurement store is an ASCII data file.

3. A method according to claim 2, wherein the data file is an IT8-formatted data file.

4. A method according to claim 1, wherein the spatial information comprises a location of the color patch in the target image.

5. A method according to claim 1, wherein the spatial information comprises color patch size information.

6. A method according to claim 1, wherein the color reproduction device is a printer, obtaining a measurement of a color patch reproduced by the printer further comprising:

printing the color patch using the printer and the color value of the entry in the measurement store; and measuring a printed color corresponding to the color patch.

7. A method according to claim 1, wherein the color reproduction device is a monitor, obtaining a measurement of a color patch reproduced by the monitor further comprising:

displaying the color patch on the monitor using the color value of the entry in the measurement store; and measuring a displayed color corresponding to the color patch.

8. A method according to claim 1, wherein the method further comprising:

generating the target image using the color value to provide input to the output color device.

9. A method according to claim 1, wherein the method further comprising:

characterizing the color reproduction device using the measurement store.

10. A method of integrating characterization information associated with a target image for use with a color reproduction input device comprising:

obtaining a measurement store having an entry corresponding to a color patch of a target image, the entry comprising a color value of the color patch;

obtaining a digital copy of the target image using the input device;

updating the entry in the measurement store to include spatial information of the color patch in the target image;

obtaining a measurement of the color patch in the target image based on a retrieved control signal corresponding to a detected color of the color patch in the target image; and updating the entry in the measurement store to include the control signal, wherein the control signal replaces the color value in the measurement store.

11. A method of integrating characterization information associated with a target image for use with a color reproduction input device comprising:

obtaining a measurement store having an entry corresponding to a color patch of a target image, the entry comprising a color value of the color patch;

obtaining a digital copy of the target image using the input device;

updating the entry in the measurement store to include spatial information of the color patch in the target image;

obtaining a measurement of the color patch in the target image based on a retrieved control signal corresponding to a detected color of the color patch in the target image; and updating the entry in the measurement store to add the control signal as an input signal component of the entry.

12. A method of integrating characterization information associated with a target image for use with a color reproduction device comprising:

obtaining a measurement store having an entry corresponding to a color patch of a target image, the entry comprising a color value of the color patch;

updating the entry in the measurement store to include spatial information of the color patch in the target image;

obtaining a measurement of the color patch in the target image;

updating the entry in the measurement store to include the measurement; and identifying a measurement status using the measurement store.

13. A method according to claim 12, wherein an entry format includes a color value component, a spatial component and a measurement component, identifying a measurement status further comprising:

examining the measurement store to determine whether the entry is missing data in at least one of the components.

14. A method according to claim 13, wherein examining the measurement store to determine whether the entry is missing data further comprising:

determining whether the entry includes a placeholder representing the missing data.

15. A method according to claim 14, wherein the placeholder is a non-numeric placeholder.

16. A method according to claim 13, wherein the method further comprising:

initiating measurement at a point of updating the measurement store to include spatial information, if the entry's spatial component is missing all or some portion.

17. A method according to claim 13, wherein the method further comprising:

obtaining a measurement of the color patch, if the measurement component is missing all or some portion.

18. A method of integrating characterization information associated with a target image for use with a color reproduction device comprising:

obtaining a measurement store having an entry corresponding to a color patch of a target image, the entry comprising a color value of the color patch;

updating the entry in the measurement store to include spatial information of the color patch in the target image;

obtaining a measurement of the color patch in the target image;

updating the entry in the measurement store to include the measurement;

generating the color patch in the target image using the color value of the entry in the measurement store, wherein the measurement store is updated to include target dimension information.

19. A computer-readable medium which stores computer-executable process steps for integrating characterization information associated with a target image for use with a color reproduction device, the computer-readable process steps comprising:

an obtaining step to obtain a measurement store having an entry corresponding to a color patch of a target image, the entry comprising a color value of the color patch, which is used by the color reproduction device to create the target image;

an updating step to update the entry in the measurement store to include spatial information of the color patch in the target image, the spatial information relates to a position of the color patch;

an obtaining step to obtain a measurement of the color patch in the target image by measuring, using a color measuring device, a color of the target image based on the spatial information; and an updating step to update the entry in the measurement store to include the measurement.

20. A computer-readable medium according to claim 19, wherein the measurement store is an ASCII data file.

21. A computer-readable medium according to claim 20, wherein the data file is an IT8-formatted data file.

22. A computer-readable medium according to claim 19, wherein the spatial information comprises a location of the color patch in the target image.

23. A computer-readable medium according to claim 19, wherein the spatial information comprises color patch size information.

24. A computer-readable medium according to claim 19 wherein the color reproduction device is a printer, the obtaining step to obtain a measurement of a color patch reproduced by the printer further comprising:
- a printing step to print the color patch using the printer and the color value of the entry in the measurement store; and
- a measuring step to measure a printed color corresponding to the color patch.

25. A computer-readable medium according to claim 19 wherein the color reproduction device is a monitor, the obtaining step to obtain a measurement of a color patch reproduced by the monitor further comprising:
- a displaying step to display the color patch on the monitor using the color value of the entry in the measurement store; and
- a measuring step to measure a displayed color corresponding to the color patch.

26. A computer-readable medium according to claim 19, wherein the computer-executable process steps further comprising:
- a generating step to generate the target image using the color value to provide input to the output color device.

27. A computer-readable medium according to claim 19, wherein the computer-executable process steps further comprising:
- a characterizing step to characterize the color reproduction device using the measurement store.

28. A computer-readable medium which stores computer-executable process steps for integrating characterization information associated with a target image for use with a color reproduction input device comprising:
- an obtaining step of obtaining a measurement store having an entry corresponding to a color patch of a target image, the entry comprising a color value of the color patch;
- an obtaining step of obtaining a digital copy of the target image using the input device;
- an updating step of updating the entry in the measurement store to include spatial information of the color patch in the target image;
- an obtaining step of obtaining a measurement of the color patch in the target image based on a retrieved control signal corresponding to a detected color of the color patch in the target image; and
- an updating step of updating the entry in the measurement store to include the control signal, wherein the control signal replaces the color value in the measurement store.

29. A computer-readable medium which stores computer-executable process steps for integrating characterization information associated with a target image for use with a color reproduction input device comprising:
- an obtaining step of obtaining a measurement store having an entry corresponding to a color patch of a target image, the entry comprising a color value of the color patch;
- an obtaining step of obtaining a digital copy of the target image using the input device;
- an updating step of updating the entry in the measurement store to include spatial information of the color patch in the target image;
- an obtaining step of obtaining a measurement of the color patch in the target image based on a retrieved control signal corresponding to a detected color of the color patch in the target image; and
- an updating step of updating the entry in the measurement store to add the control signal as an input signal component of the entry.

30. A computer-readable medium which stores computer-executable process steps for integrating characterization information associated with a target image for use with a color reproduction device, the computer-readable process steps comprising:
- an obtaining step to obtain a measurement store having an entry corresponding to a color patch of a target image, the entry comprising a color value of the color patch;
- an updating step to update the entry in the measurement store to include spatial information of the color patch in the target image;
- an obtaining step to obtain a measurement of the color patch in the target image;
- an updating step to update the entry in the measurement store to include the measurement; and
- an identifying step to identify a measurement status using the measurement store.

31. A computer-readable medium according to claim 30, wherein an entry format includes a color value component, a spatial component and a measurement component, the identifying step to identify a measurement status further comprising:
- an examining step to examine the measurement store to determine whether the entry is missing data in at least one of the components.

32. A computer-readable medium according to claim 31, wherein the examining step to examine the measurement store to determine whether the entry is missing data further comprising:
- a determining step to determine whether the entry includes a placeholder representing the missing data.

33. A computer-readable medium according to claim 32, wherein the placeholder is a non-numeric placeholder.

34. A computer-readable medium according to claim 31, wherein the computer-executable process steps further comprising:
- an initiating step to initiate measurement at a point of updating the measurement store to include spatial information, if the entry's spatial component is missing all or some portion.

35. A computer-readable medium according to claim 31, wherein the computer-executable process steps further comprising:
- an obtaining step to obtain a measurement of the color patch, if the measurement component is missing all or some portion.

36. A computer-readable medium which stores computer-executable process steps for integrating characterization information associated with a target image for use with a color reproduction device, the computer-readable process steps comprising:
- an obtaining step to obtain a measurement store having an entry corresponding to a color patch of a target image, the entry comprising a color value of the color patch;
- an updating step to update the entry in the measurement store to include spatial information of the color patch in the target image;
- an obtaining step to obtain a measurement of the color patch in the target image;
- a generating step to generate the color patch in the target image using the color value of the entry in the measurement store; and an updating step to update the entry in the measurement store to include the measurement, wherein the measurement store is updated to include target dimension information.

37. A memory for integrating characterization information associated with a target image for use with a color reproduction device, the memory comprising:
   a color component comprising a color value representing a color patch of a target image, the color component being used by the color reproduction device to create the target image;
   a spatial component, the spatial component updated with spatial information of the color patch in the target image, the spatial information relates relating to a position of the color patch; and
   a measurement component, the measurement component updated with a measurement obtained by measuring, using a color measuring device, a color of the color patch of the target image based on the spatial information.

38. A memory according to claim 37, wherein the memory is an ASCII data file.

39. A memory according to claim 38, wherein the data file is an IT8-formatted data file.

40. A memory according to claim 37, wherein the spatial component includes a location of the color patch in the target image.

41. A memory according to claim 37, wherein the spatial component includes color patch size information.

42. A memory according to claim 37, wherein the memory further comprising a format structure including format information of said memory.

43. A memory according to claim 42, wherein the format information comprises at least one position tag identifying a data type of an element in the spatial component.

44. A memory according to claim 42, wherein the format information includes dimension information of the target image.

45. A memory according to claim 42, wherein the format information includes a uniform sizing of color patches in the target image.

46. A memory according to claim 42, wherein the format information includes a unit of measure of elements in the spatial component.

47. A memory according to claim 37, wherein the memory further comprising:
   a signal component comprising a control signal representing a detected color of the color patch.

48. A memory according to claim 47, wherein the signal component is stored in place of the color component.

49. A memory for integrating characterization information associated with a target image for use with a color reproduction device, the memory comprising:
   a color component comprising a color value representing a color patch of a target image;
   a spatial component, the spatial component comprising position information of the color patch in the target image generated using the color value; and
   a measurement component, the measurement component representing a measurement of the color patch, wherein a placeholder is usable in the spatial and measurement components to identify missing data.

50. A memory according to claim 49, wherein the placeholder is a non-numeric placeholder.

\* \* \* \* \*

UNITED STATES PATENT AND TRADEMARK OFFICE
CERTIFICATE OF CORRECTION

PATENT NO. : 7,038,811 B1  Page 1 of 1
APPLICATION NO. : 09/538947
DATED : May 2, 2006
INVENTOR(S) : John S. Haikin It is certified that error appears in the above-identified patent and that said Letters Patent is hereby corrected as shown below:

ON THE TITLE PAGE #56
Under "References Cited, U.S. Patent Documents", the following should be added:

-- 	5,200,816 * 4/1993 	Rose 	358/518
	5,227,872 * 7/1993 	Yamaguchi 	358/529
	5,296,923 * 3/1994 	Hung 	358/527
	5,381,349 * 1/1995 	Winter, et al 	382/167
	5,621,873 * 4/1997 	Tanaka, et al 	715/517
	5,781,206 * 7/1998 	Edge 	347/19
	6,141,120 * 10/2000 	Falk 	358/504
	6,141,464 * 10/2000 	Handley 	382/287
	6,181,354 * 1/2001 	Swan 	345/571
	6,381,037 * 4/2002 	Balasubramanian, et al 	358/3.23
	6,441,923 * 8/2002 	Balasubramanian, et al 	358/3.23
	6,512,845 * 1/2003 	Haikin, et al 	382/165
	6,556,312 * 4/2003 	Nagatani 	358/1.9
	2002/0065843 * 	5/2002 	Sharma, et al.
	2003/0058459 * 	3/2003 	Wu, et al. 	--

COLUMN 17
Line 14, "relates relating" should read --relating--.

Signed and Sealed this

Twentieth Day of March, 2007

JON W. DUDAS
*Director of the United States Patent and Trademark Office*